(12) United States Patent
Babjak

(10) Patent No.: US 7,152,837 B1
(45) Date of Patent: Dec. 26, 2006

(54) HANGER APPARATUS

(76) Inventor: James Babjak, 15796 W. Eucalyptus Ct., Surprise, AZ (US) 85374

( * ) Notice: Subject to any disclaimer, the term of this patent is extended or adjusted under 35 U.S.C. 154(b) by 0 days.

(21) Appl. No.: 10/785,451

(22) Filed: Feb. 24, 2004

(51) Int. Cl.
*F16B 45/00* (2006.01)

(52) U.S. Cl. ............... 248/304; 248/690; 24/550; 24/458

(58) Field of Classification Search ........... 248/301, 248/302, 303, 304, 684, 686, 690, 692; 24/550, 24/296, 458; 211/106.01, 106, 181.1; 224/560, 224/556, 557, 927
See application file for complete search history.

(56) References Cited

U.S. PATENT DOCUMENTS

| | | | | |
|---|---|---|---|---|
| 903,067 A | * | 11/1908 | Engman | 431/296 |
| 1,264,677 A | * | 4/1918 | Murrell | 411/438 |
| 1,966,520 A | * | 7/1934 | Rayner | 411/17 |
| 2,066,886 A | * | 1/1937 | Henn | 248/690 |
| 2,835,465 A | * | 5/1958 | Patterson | 248/201 |
| 3,613,897 A | * | 10/1971 | Filler | 211/120 |
| 3,983,736 A | * | 10/1976 | King, Jr. | 72/362 |
| 4,309,135 A | * | 1/1982 | Gutshall | 411/17 |
| 4,536,115 A | * | 8/1985 | Helderman | 411/17 |
| 4,635,337 A | * | 1/1987 | Helderman | 29/432 |
| 4,955,862 A | * | 9/1990 | Sepetka | 604/164.13 |
| 5,006,023 A | * | 4/1991 | Kaplan | 411/17 |
| 5,366,328 A | * | 11/1994 | Helderman | 411/17 |
| 5,383,259 A | * | 1/1995 | McIntire | 24/300 |

\* cited by examiner

*Primary Examiner*—Alfred Joseph Wujciak, III
(74) *Attorney, Agent, or Firm*—Parsons & Goltry; Michael W. Goltry; Robert A. Parsons

(57) ABSTRACT

A hanger apparatus is fabricated of a strand of material that is formed into a plurality of coils of incrementally decreasing diameter to fabricate a tapered, hollow helix. A hook or other engagement means is integrally formed at one end of the helix. The helix is compressively or frictionally engaged with an opening in a selected substrate to provide a hanger assembly for receiving and holding a selected object.

1 Claim, 5 Drawing Sheets

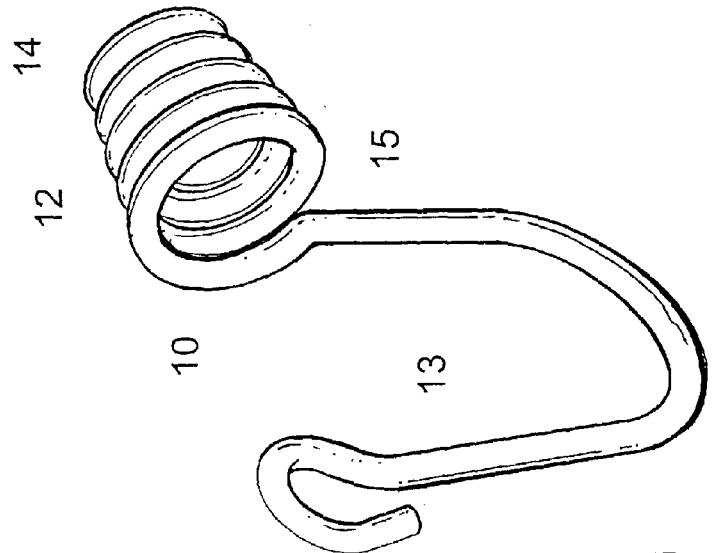
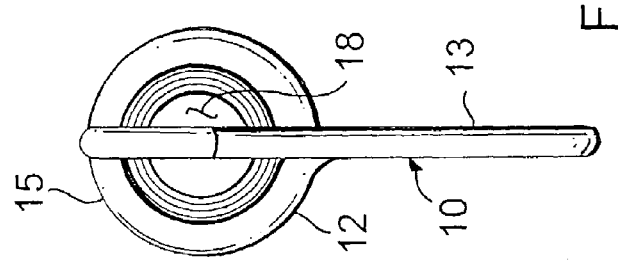
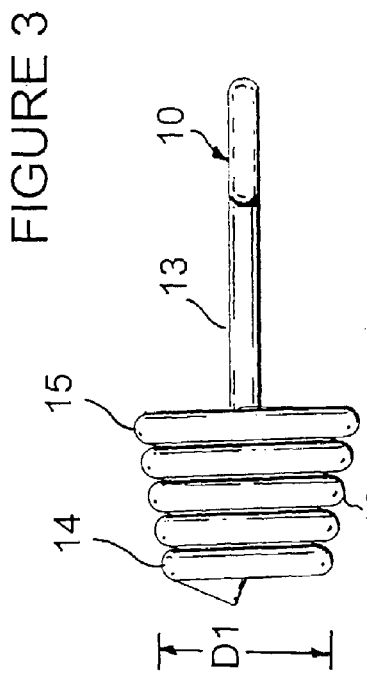
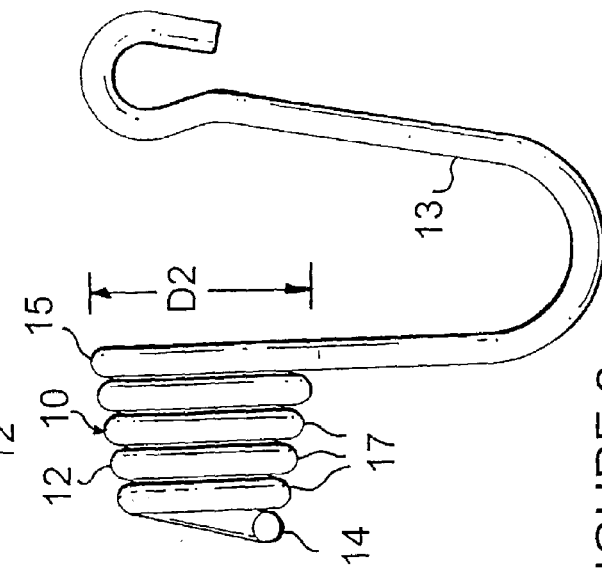

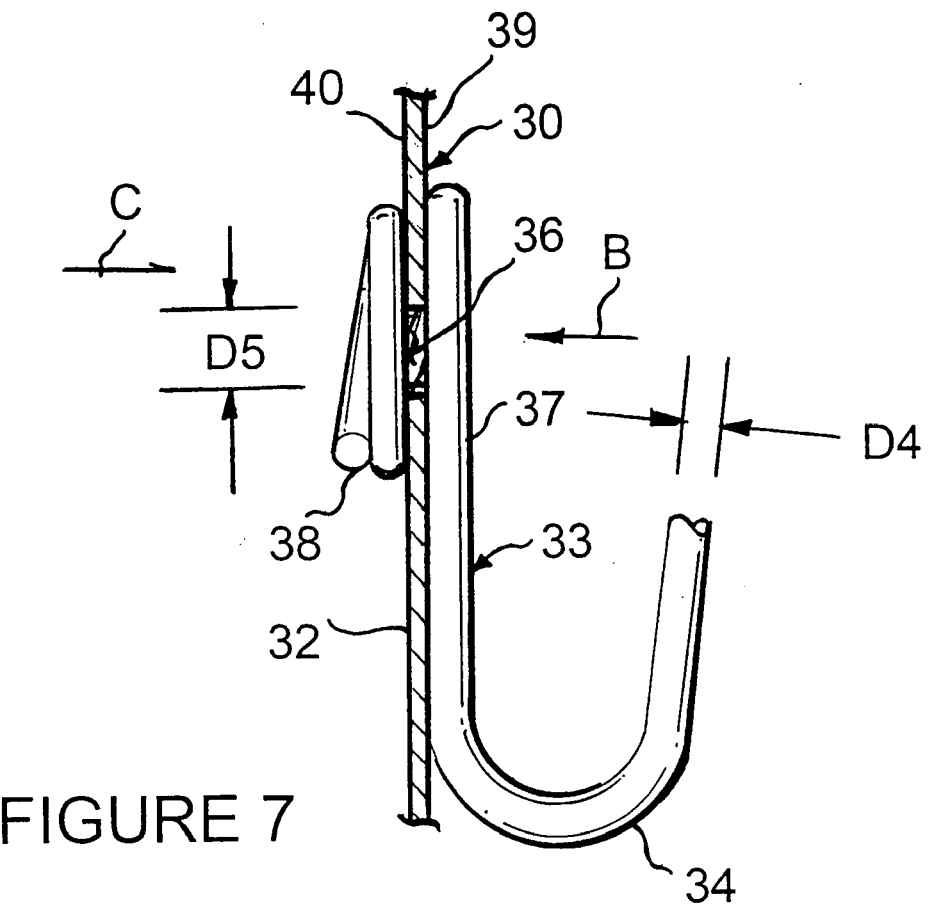
FIGURE 7
FIGURE 8
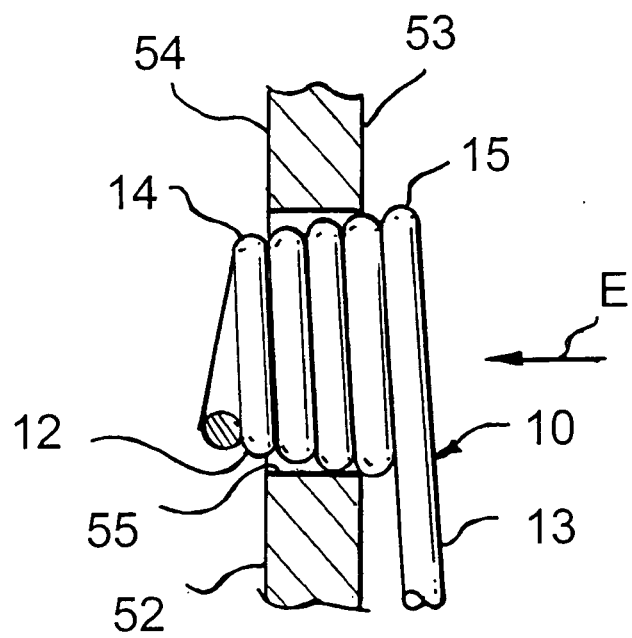

HANGER APPARATUS

FIELD OF THE INVENTION

The present invention relates to devices especially adapted for attaching a selected object to a selected substrate.

More particularly, the instant invention relates to devices commonly referred to as hanger brackets.

In a further and more specific aspect, the current invention concerns an omnibus hanger assembly that is readily securable to various substrates.

BACKGROUND OF THE INVENTION

It is common practice to permanently or detachably attach assorted objects to structurally diverse substrates. Exemplary is the hanging of pictures on the interior walls of a building, the stringing of festive holiday lights on the eaves of a house and the retention of keys or key chains on a mounted board.

To accommodate the varied substrates, the prior art has provided numerous hanger brackets, each specifically configured for securement to a substrate fabricated of a particular material. For example, screw hooks or other hanger brackets incorporating a nail or a wood screw are required for securement to a substrate fabricated of wood or similar material. Relatively thin sheet material requires a hanger bracket incorporating a sheet metal screw. Substrates fabricated of a frangible material, such as sheet rock or wallboard require a bracket including a molly or toggle bolt that will distribute the holding force over a substantial area. Securing to a concrete substrate generally entails the insertion of a lead or plastic anchor, which in turn will accept a lag screw.

With reference to the foregoing, the hanger bracket is commonly affixed from the face side of the substrate. The rear side of a substrate is generally not accessible. Therefore, use of a two-part attachment, such as a bolt and nut, is not possible.

The profusion of prior art hanger brackets, each devised for use with a specific substrate, is further complicated by necessity of a drilling or otherwise forming a hole of precise dimension to accommodate the attachment member relative the chosen bracket. In an attempt to resolve this complexity, the prior art has provided a hanger bracket which is adhesively affixed to the substrate. Adhesively affixed hanger brackets, however, are restricted to a reduced load bearing capacity. Further, such hanger brackets are not universally usable with all substrates.

Given the specificity of prior art hanger brackets and the associated diversity of substrates, it would be highly desirable to provide an omnibus hanger bracket that is readily securable to substrates of various and diverse construction. It is intended that such a bracket be relatively inexpensive to fabricate and easily secured to a selected substrate.

SUMMARY OF THE INVENTION

The above perplexities and others are at least partially solved and the above purposes and others realized in new and improved hanger apparatus having omnibus properties. In accordance with the principle of the present invention, a preferred embodiment of the invention is a hanger apparatus having a helix including an anterior coil and a posterior coil. Engagement means, preferably in the form of a hook, for receiving and holding a selected object is carried by the helix. Preferably the posterior coil has a diameter larger than the diameter of the anterior coil. The inclusion of one or more coils of incrementally graduated diameters intermediate the anterior coil and the posterior coil imparts a frustoconical shape to the helix. It is anticipated that the helix is fabricated of a strand of material whereby the helix has a hollow core. The strand of material may be substantially rigid or, alternately, rigid.

In accordance with the principle of the invention, provided is a hanger assembly that consists of a substrate, a helix including at least first and second coils for receiving said substrate therebetween and engagement means carried by the helix. More specifically, the substrate includes first and second sides wherein the first coil of the helix is received in juxtaposition with the first side of the substrate and the second coil of the helix is received in juxtaposition with the second side of the substrate. The coils are mutually biased for compressively retaining the substrate therebetween. The engagement means is in the form of a hook depending from one of the coils.

In accordance with the principle of the invention, provided is another embodiment of a hanger assembly consisting of a hanger apparatus including a tapered helix having a plurality of coils including an anterior coil having a first diameter and a posterior coil having a second diameter; the anterior coil being of lesser diameter than the diameter of the posterior coil. Engagement means, preferably in the form of a hook is carried by the posterior coil. The assembly further includes a substrate having an opening for receiving said anterior coil therethrough. It is within the scope of the invention that the opening in the substrate has a diameter smaller than the diameter of the anterior coil. It is also perceived that the coils of the helix may be fabricated of a substantially rigid or substantially resilient material.

In accordance with the principle of the invention, provided is yet another embodiment including a strand having a finite diameter formed into a helix and having engagement means integral therewith. Also provided is a substrate having an opening sized to receive the strand therethrough. Selectively, the stand may be substantially rigid or, alternately, rigid. Engagement means for receiving and holding a selected object, preferably in the form of a hook, is carried by the helix.

In accordance with the principle of the present invention, contemplated is a method of securing a selected object to a selected substrate. In accordance with a preferred embodiment, the method includes the steps of forming a strand of material into a helix having engagement carried thereby. The method also includes the step of creating and opening in the substrate for receiving the strand therethrough. In a more specific embodiment, the step of forming includes the substep of configuring the strand into a hollow tapered helix having an anterior coil and a posterior coil and sizing the opening in the substrate to receive the anterior coil therethrough. And additional step is compressively receiving the substrate between the anterior coil and the posterior coil. Alternately, the additional step consists of frictionally receiving the helix within the opening.

BRIEF DESCRIPTION OF THE DRAWINGS

Referring to the drawings:

FIG. 1 is a perspective view of a hanger apparatus constructed in accordance with the principle of the instant invention;

FIG. 2 is a side elevation view of the apparatus of claim 1;

FIG. 3 is a top plan view of the apparatus of claim 1;

FIG. 4 is a rear end elevational view of the apparatus of claim 1;

FIG. 7 is a vertical sectional view taken along the line 7—7 in FIG. 6 and especially illustrating an alternate embodiment of the invention in accordance with the principle thereof;

FIG. 8 is a view generally similar to that of FIG. 7 and showing another alternate embodiment in accordance with the teachings of the present invention.

DETAILED DESCRIPTION OF A PREFERRED EMBODIMENT

Figures 5, 5A, 5B:
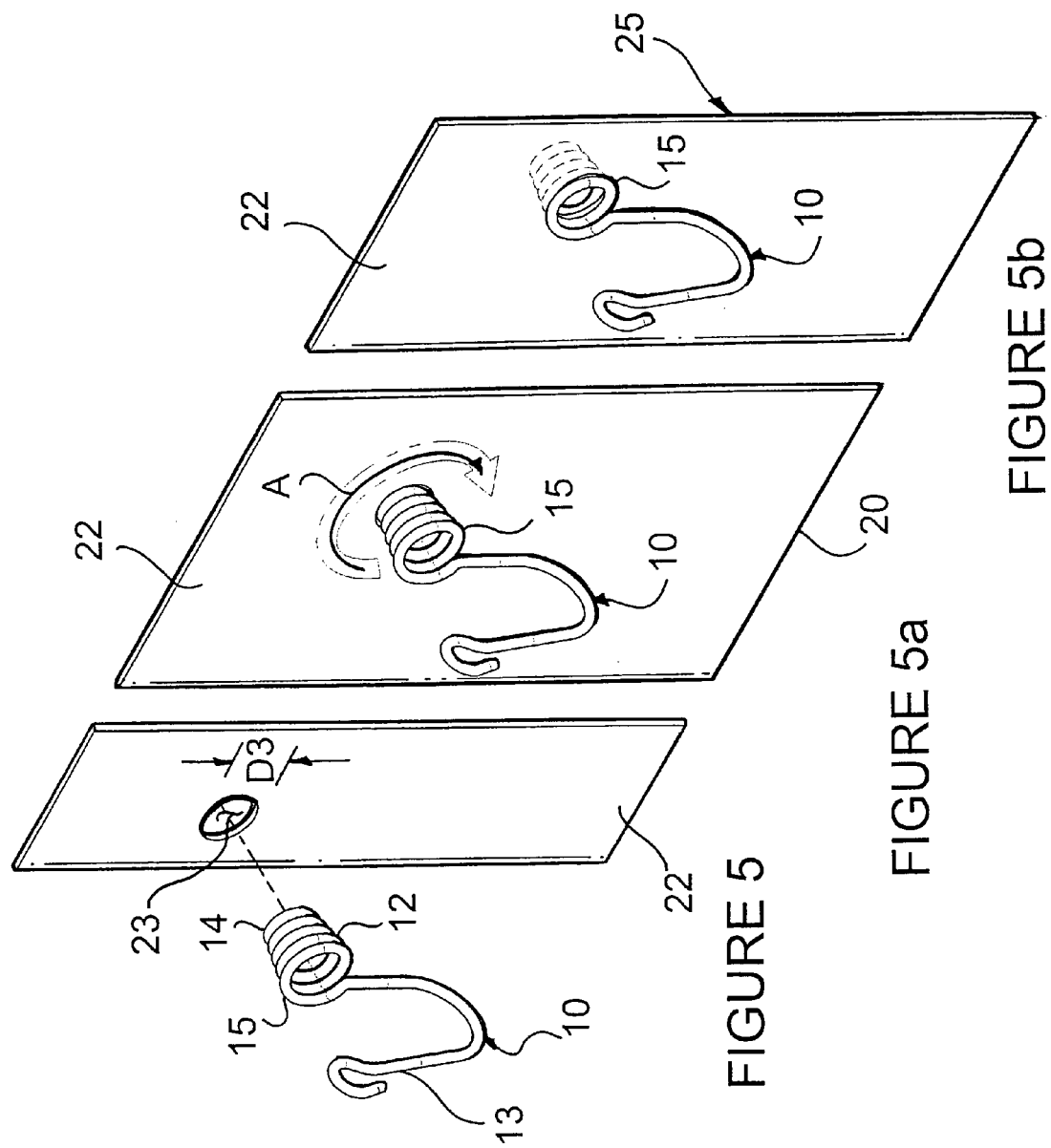
FIG. 5 is a perspective view of an initial step in the method of fabricating a hanger assembly in accordance with the principle of the present invention.
FIG. 5a is a view generally similar to the view of FIG. 5 and illustrating an intermediate step in the method of fabricating a hanger assembly.
FIG. 5b is another view generally similar to the view of FIG. 5 and depicting a terminal step in the method of fabricating a hanger assembly.

Turning now to the drawings, in which like reference characters indicated corresponding elements through the several views, attention is first directed to FIG. 1 in which is seen a hanger apparatus, embodying the principle of the instant invention and generally designated by the reference character 10, including helix 12 and hook 13. With additional reference to FIGS. 2 and 3, it is seen that helix 12 includes anterior coil 14, posterior coil 15 and a plurality of intermediate coils 17. Anterior coil 14 has a diameter designated D1. Posterior coil 15 has a diameter designated D2. Diameter D2 is larger than diameter D1. The diameters of the several intermediate coils 17 are incrementally graduated. Accordingly, helix 12 is tapered to assume a frusto-conical shape having larger rearward end defined by posterior coil 15 and a smaller forward end defined by anterior coil 14. As particularly illustrated in FIG. 5, anterior coil 14, posterior coil 15 and the several intermediate coils 17 define a hollow core 18 within helix 12.

Preferably, hanger apparatus 10 including coil 12 and hook 13, are integrally fabricated of a single strand of generally cylindrical material. Preferred materials include spring tempered metal and resilient plastic. Depending upon specific use, the apparatus may also be fabricated of a substantially rigid material. Further details of hanger apparatus 10, and the use thereof as an element in a hanger assembly, will become readily apparent to those skilled in the art as the description ensures.

FIG. 5 depicts the initial step in the method of creating a hanger assembly including previously described hanger apparatus 10 is the selection of a substrate. Chosen for purposes of illustration herein is a substrate 20 in the form of a panel such as may be of metal, wood or plastic and having an exposed or front surface 22. As the method proceeds, an opening 23 is formed, as by drilling or other conventional means, in panel 20. In accordance with the immediately preferred embodiment of the invention, opening 23 has a diameter D3 which is larger than diameter D1 of anterior coil 14 and smaller than diameter D2 of posterior coil 15.

Figure 6:
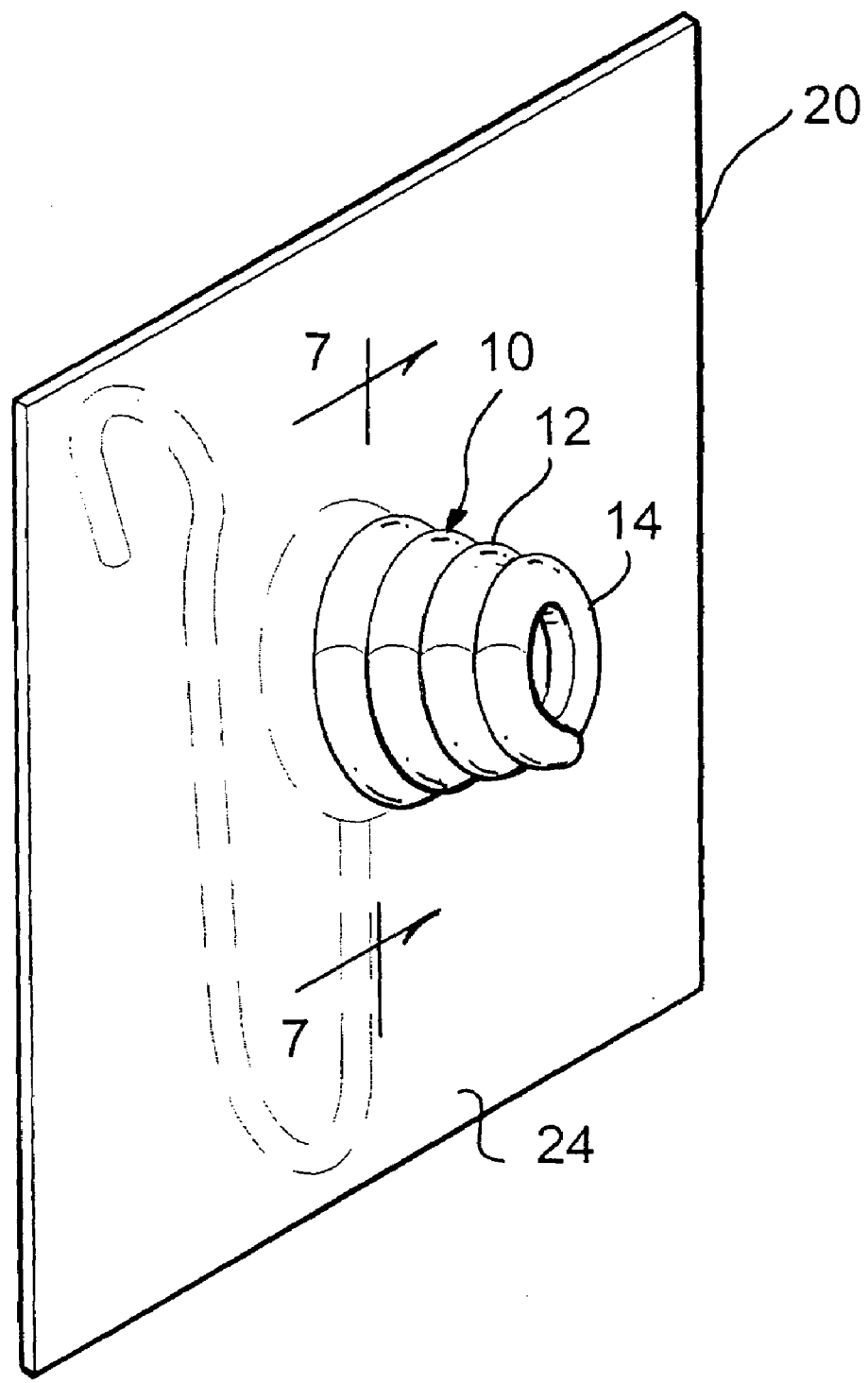
FIG. 6 is a perspective view especially showing the rear side of a hanger assembly in accordance with the principle of the instant invention.

Subsequently, as illustrated in FIG. 5a, anterior coil 14 of helix 12 is inserted into opening 23 of substrate 20. Hanger apparatus 10 is then rotated as denoted by the arcuate arrowed line A. The rotation continues until substrate 20 is received between two coils of helix 12 as further noted in FIG. 5b. One or more coils of helix 12 will advance to the unexposed or rear surface 24 of substrate 20 as seen in FIG. 6. The union of hanger apparatus 10 with substrate 20 provides a hanger assembly, generally designated by the reference character 25, as clearly seen in Fig.

Illustrated in FIG. 7 is an alternate embodiment of a hanger assembly, generally designated by the reference character 30. The immediate embodiment, in general similarity to the previously described embodiment 24, includes a substrate, generally designated, 32 in the form of a relatively thin panel and a hanger apparatus, generally designated 33, having integral hook 34. It is noted that the strand of material of which hanger apparatus is formed has a diameter designated D4.

Hanger assembly 30 differs from the previously described embodiment 25 in that the opening 36 in substrate 32 has a diameter D5 which is sized to receive therethrough a strand having diameter D4. Further modification of the immediate hanger assembly 30 resides within hanger apparatus 33 having only first and second coils 37 and 38, respectively. The coils 37 and 38 are mutually biased inward, as indicated by the arrowed lines B and C, respectively, thereby compressively receiving substrate 32 therebetween. More specifically first coil 37 resides in juxtaposition with first surface 39 of substrate 32 and second coil 38 resides in juxtaposition with second surface 40 of substrate 32. It is immediately apparent that hanger apparatus can be simply clipped over an edge of a selected substrate. In all other aspects not specifically noted, hanger assembly 30 is analogous to hanger assembly 25.

Another alternate embodiment of a hanger assembly constructed in accordance with the principle of the present invention is seen with reference to FIG. 8. The immediate embodiment, generally designated by the reference character 50, includes substrate 52 in which the first and second sides 53 and 54, respectively, are widely spaced. This embodiment incorporates previously described hanger apparatus 10. Formed in substrate is an opening 55 having a diameter which is larger than the diameter of anterior coil 14 and smaller than the diameter of posterior coil 15. Fabricated of a strand of either resilient or substantially rigid, hanger apparatus is inserted into opening 55. While pressure is exerted in the direction designated by the arrowed line E, hanger apparatus is rotated, thereby frictionally engaging helix 12 within opening 55.

Figure 9:
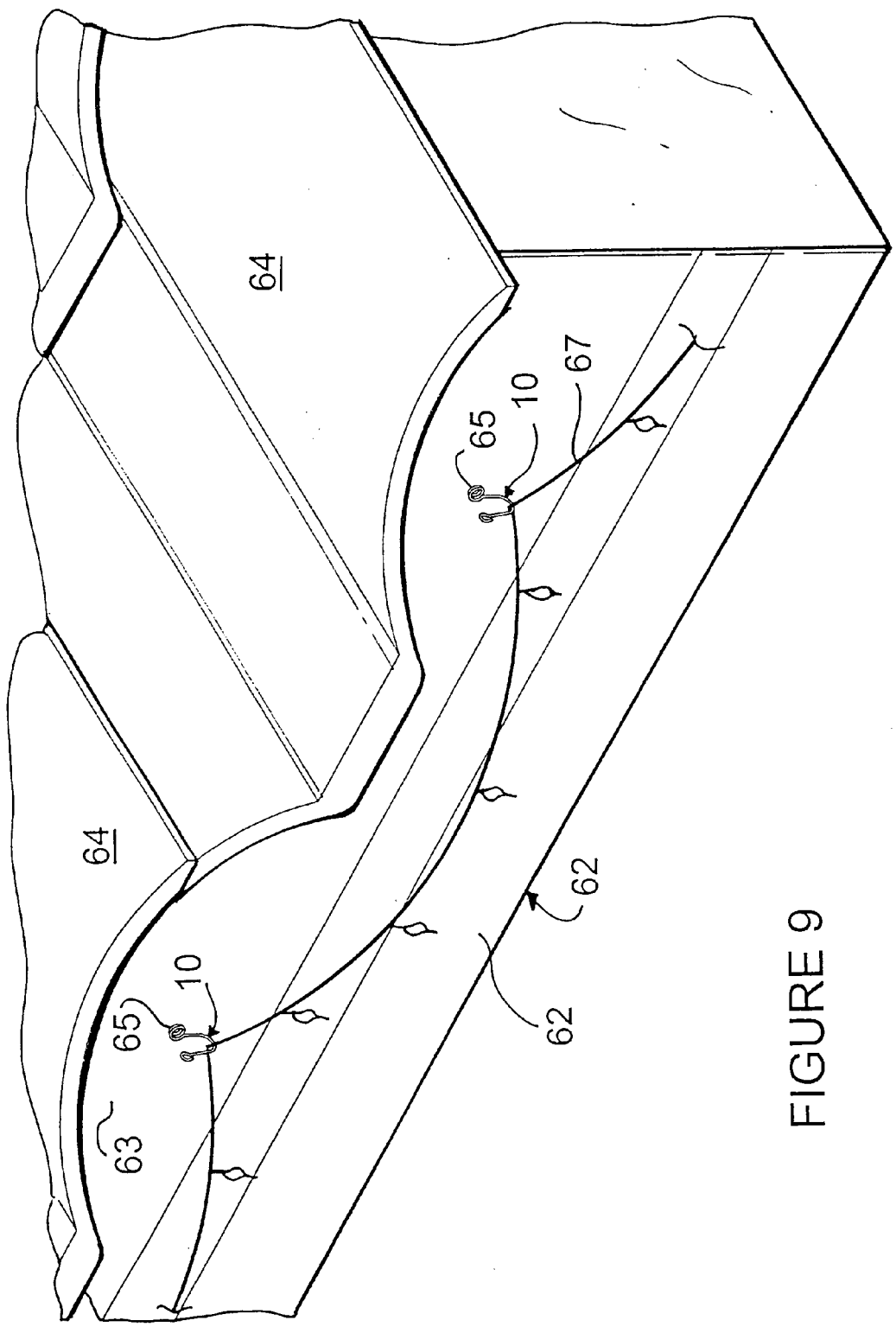
FIG. 9 is a fragmentary perspective view of a roof and soffit of a building incorporating a hanger assembly in accordance with the principle of this invention.

Illustrated in FIG. 9 is a section of a conventional building roof, generally designated by the reference character 60, including fascia 62, soffit 63 and tiles 64. As will be appreciated by those skilled in the art, soffits are commonly provided with ventilation openings 65. In accordance with the immediate embodiment of the invention soffit 63 functions as the substrate. Openings 65 receive helix 12 of previously described hanger apparatus 10 to provide an embodiment of a hanger assembly. Hook 13 is capable of receiving and holding a selected object. For illustrative purposes, the selected object is herein illustrated as a string of festive holiday lights 67. It is particularly noted that access to the rear side of the substrate is not required and that the opening can be blind.

The present invention is described above with reference to preferred embodiments. However, those skilled in the art will recognize that changes and modifications may be made in the described embodiments without departing from the nature and scope of the present invention. Various changes and modifications to the embodiments herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

1. A hanger assembly comprising:
 a supporting substrate having opposing first and second sides and an opening therethrough extending from said first side to said second side;
 a helix extending through said opening and including at least a first coil and a second coil;
 said first and second coils fabricated of a strand of material and having incrementally graduated diameters forming a frusto-conically tapered shape of said helix having a hollow core, said first coil having a larger diameter than said second coil;
 engagement means depending from said first coil for receiving and supporting a selected object;
 said first coil received against said first side of said substrate and said second coil received against said second side of said substrate;
 said first and second coils of said helix mutually biased compressively retaining said substrate therebetween said first and second coils; wherein said engagement means includes a hook.

* * * * *